(12) United States Patent
Biswas et al.

(10) Patent No.: US 8,761,358 B2
(45) Date of Patent: Jun. 24, 2014

(54) SEAMLESS CALL TRANSFER

(71) Applicants: Debanjan Biswas, Bangalore (IN);
Nagendra Kunuturi, Bangalore (IN);
Vijayendra Shetty, Bangalore (IN);
Sharadandu Konuthula, Bangalore
(IN); Michelle Concannon, Cuilbeg (IE)

(72) Inventors: Debanjan Biswas, Bangalore (IN);
Nagendra Kunuturi, Bangalore (IN);
Vijayendra Shetty, Bangalore (IN);
Sharadandu Konuthula, Bangalore
(IN); Michelle Concannon, Cuilbeg (IE)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 13/676,915

(22) Filed: Nov. 14, 2012

(65) Prior Publication Data

US 2014/0133638 A1    May 15, 2014

(51) Int. Cl.
*H04M 11/00*    (2006.01)

(52) U.S. Cl.
USPC ........................................ 379/90.01; 370/352

(58) Field of Classification Search
USPC .................. 379/93.02, 90.01, 93.01; 370/352
See application file for complete search history.

(56) References Cited

U.S. PATENT DOCUMENTS

| | | | |
|---|---|---|---|
| 2006/0176874 A1* | 8/2006 | Shaffer et al. ................. | 370/352 |
| 2011/0188410 A1* | 8/2011 | Levin et al. ................... | 370/259 |
| 2012/0131377 A1 | 5/2012 | Baird et al. | |
| 2013/0326072 A1* | 12/2013 | Smyth et al. ................. | 709/227 |

* cited by examiner

*Primary Examiner* — Stella Woo
(74) *Attorney, Agent, or Firm* — Baker Botts L.L.P.

(57) ABSTRACT

Techniques for providing for a seamless call transfer in a virtual desktop environment are supported. An apparatus may be capable of requesting access to a remote computer system for registration with a call manager, determining whether a call associated with the apparatus is active, automatically initiating suspension of the call in response to determining that the call is active and requesting registration of a telephone associated with the call, and resuming the suspended call. The seamless call transfer system may result in a more favorable calling experience during authentication with a virtual desktop environment and registration with a call manager.

21 Claims, 3 Drawing Sheets

SEAMLESS CALL TRANSFER

TECHNICAL FIELD OF THE INVENTION

This invention relates generally to the call transfer and more specifically to the seamless transfer of a call during virtual desktop authentication.

BACKGROUND OF THE INVENTION

Many virtual desktop environments include telephonic features. Such features may include facilitating phone calls, call holding, call forwarding, emergency calling, and directory services. In some systems, in order to obtain a complete feature set for a telephone system, a thin client hosting a virtual desktop environment may connect to remote computer systems.

SUMMARY OF THE INVENTION

In accordance with the present disclosure, a seamless call transfer apparatus is provided which substantially eliminates or reduces disadvantages and problems associated with previous systems and methods.

According to a particular embodiment, a seamless call transfer apparatus is provided which includes a network interface, a memory including an application, and a processor capable of executing the application to implement various features. In particular, the application can request access to a remote computer system for registration with a call manager, determine whether a call associated with the apparatus is active, automatically initiate suspension of the call in response to determining that the call is active and request registration of a telephone associated with the call, and resume the suspended call. The registration may result in associating a new telephone number with the telephone.

Particular embodiments of the present invention may provide one or more technical advantages. For example, certain embodiments may provide seamless transfer of an active call during an hosted virtual desktop authentication process such that the call is not lost or dropped. Particular embodiments may allow for a client or telephone associated with the client to acquire a new directory number managed by a call manager even though an active call is taking place. In addition, certain embodiments may minimize the undesired latency associated with the seamless call transfer.

Other technical advantages of the present invention will be readily apparent to one skilled in the art in the following figures, descriptions, and claims. Moreover, while specific advantages have been enumerated above, various embodiments may include all, some, or none of the enumerated advantages.

DESCRIPTION OF EXAMPLE EMBODIMENTS

Figure 1:
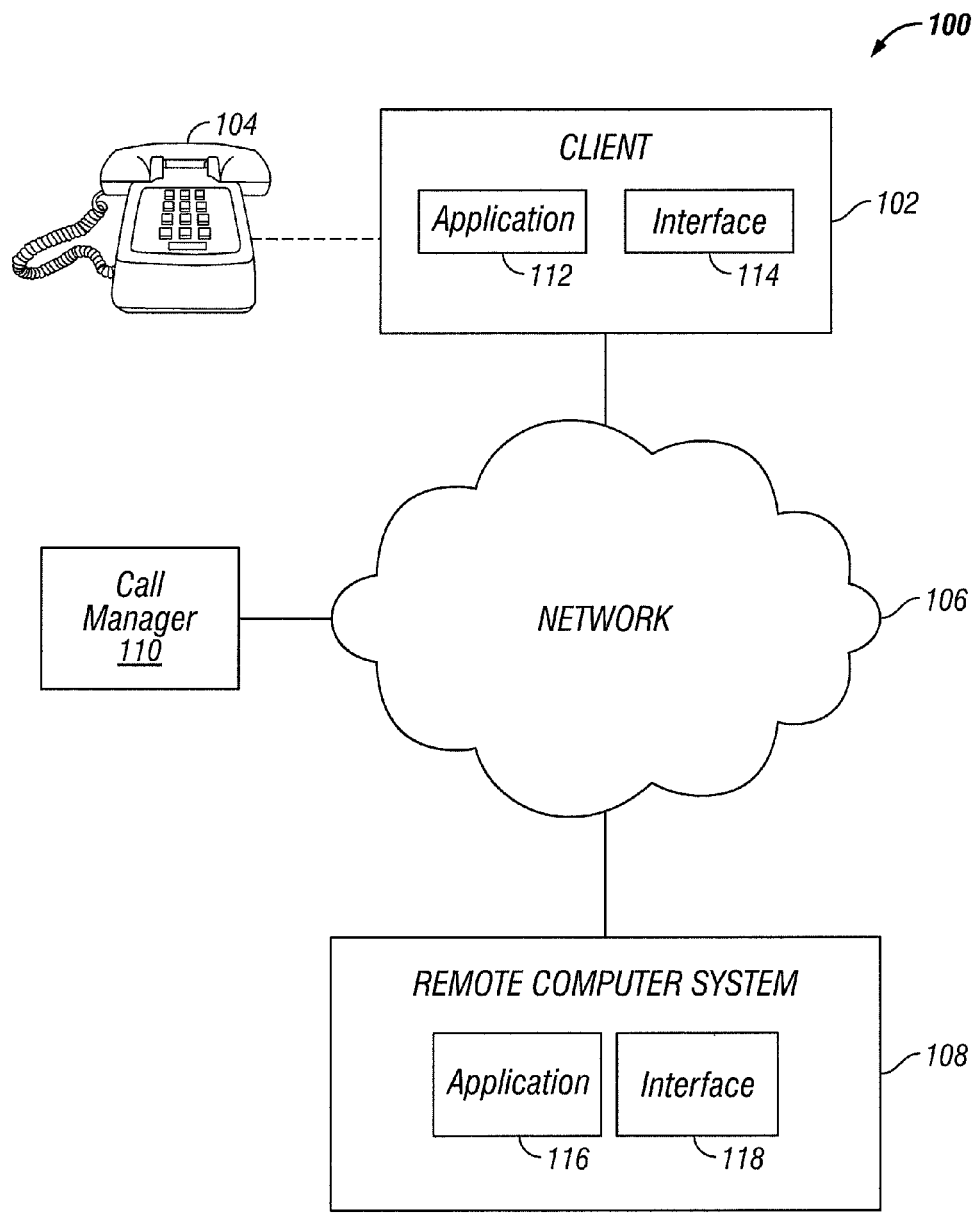
FIG. 1 is a block diagram illustrating a system environment with elements that interoperate to facilitate virtual desktop functionality.

FIG. 1 is a block diagram illustrating a system 100 with elements that interoperate to manage virtual desktop functionality for any number of clients. The elements of system 100 can support a number of different operations, including facilitating simultaneous, seamless access by numerous thin clients to hosted applications and files maintained on a remote system. In some embodiments, such remote systems may also provide a rich set of telephony features. Users can seek access to the remote system to access software applications, data files, and shared databases. In certain embodiments, users may receive access to telephonic features provided by a call manager. In such embodiments, access to the remote system may enable users to receive a rich feature set for telephonic services and features facilitated by a call manager.

Desktop virtualization is an information technology concept that abstracts the traditional computer desktop environment experienced by the user from the physical machine actually executing the corresponding applications and hosting the data files. Desktop virtualization may be implemented in a client-server relationship. While the server may have significant computing resources in terms of processing power, memory, and communication bandwidth, the clients may have significantly less computing resources. For this reason, such clients may be referred to as "thin clients." In such a model, critical applications, files, and databases can be stored remotely at a secure location, consistently maintained, and preserved through regular backups with minimal interaction from individual users. In addition, a user may access its computing environment from any thin client that can provide connectivity to the remote computer system hosting its applications and files. Thin clients may also be embodied in a mobile device such as a smart phone, netbook, or a tablet. Virtual desktop environments may be hosted by an organization or by a third party provider. Such systems may be referred to as hosted virtual desktops (HVD).

As illustrated, system 100 includes a number of elements, such as client 102, telephone 104, network 106, and remote computer system 108, that are interconnected to provide a hosted virtual desktop environment. Client 102 represents a general-purpose computer, including appropriate hardware, controlling logic, and data that may be used to interface over a computer network 106 with other system components such as remote computer system 108. For example, client 102 may be workstations, laptops, netbooks, tablet computers, personal data assistants (PDAs), smart phone, tablet, or any other suitable computing device. Client 102 may support a wide variety of operations such as web browsing, word processing, and managing personal and business data. In certain embodiments, client 102 may support a basic set of computing functionality and require access to a hosted virtual desktop environment for complete functionality. According to particular embodiments, client 102 provides access, potentially through web-based interfaces, to information managed by other elements such as telephone 104, network 106, or remote computer system 108. In some embodiments, client 102 may be a thin client that depends on remote computer systems, such as remote computer system 108, to accomplish traditional activities provided by a computer. For example, client 102 may act as a terminal that provides virtual access to a software applications and data hosted on a remote computer system 108.

A user may seek access using client 102 and/or telephone 104 to a hosted virtual desktop environment provided by remote computer system 108. In certain embodiments, a user may participate in active telephone communications even without being logged into the hosted virtual desktop environment. In those cases, the set of telephonic features provided by client 102 and/or telephone 104 may be basic and limited to essential functionality. Additional functionality may require seeking access to the hosted virtual desktop environment and/or registration with remote call manager 110. For example, the client 102 and/or telephone 104 may use a default extension number which may be associated with a call manager 110. Once a user provides credentials and other connection related information, application 112 on client 102 may execute appropriate logic to communicate over network 106 to remote computer system 108 using an interface 114. Client 102 may also communicate with telephone 104, as appropriate, to obtain necessary information for registration and call-related functionality. The authentication process with remote computer system 108 may require processing by application 116 and call manager 110. Communications from the remote computer system 108 and client 102 and/or telephone 104 over network 106 may be facilitated by interface 118. As part of the authentication with the remote computer system 108 to access the hosted virtual desktop environment, application 116 may communicate with call manager 110 to provide a feature rich set of calling features for client 102 and/or telephone 104. In particular embodiments, such communications may include registration and authentication with the call manager. For example, registration may include an extension mobility authentication process. As a result of registration with the call manager, a new directory number may be assigned to the client 102 and/or telephone 104 to replace the default extension number which may not have been originally associated with the call manager 110 of remote computer system 108. In some embodiments, the new directory number and the default extension number may be the same.

In certain use cases, a user may be actively engaged in a telephone conversation during login, using client 102 and/or telephone 104. In those situations, registration with the call manager 110 and reassignment of directory numbers may result an active call being dropped or lost. According to the present disclosure, in order to overcome this scenario, application 112 may detect the presence of an active telephone conversation during attempted authentication to the hosted virtual desktop environment, and in response, automatically suspend the call such that it can be retrieved shortly thereafter subsequent to authentication processes and call manager registration has taken place. In other embodiments, this functionality may be performed at remote computer system 108 by appropriate logic such as application 116. In some embodiments, automatically suspending the call may involve parking the call, placing the call on hold, transferring the call without user intervention, or other suitable actions. This is because once authentication and call manager registration has taken place, the suspended call can be retrieved or activated to seamless resume normal call functionality. In particular embodiments, the automatic suspension of the call only results in minimal impact on user experience.

In the illustrated embodiment, client 102 includes various components such as application 112 and interface 114. Application 112 represents any appropriate combination of hardware, controlling logic, and data for facilitating access to a virtual desktop environment hosted by remote computer system 108. Interface 114 represents any suitable combination of hardware, controlling logic, and data for facilitating communications between various elements of system 100, including telephone 104 and remote computer system 108. For example, client 102 may use interface 114 to communicate with remote computer system 108 over network 106.

As illustrated, system 100 includes a telephone 104. Telephone 104 represents any appropriate combination of hardware, controlling logic, and data for providing telephonic communications and features. For example, telephone 104 may be a physical telephone or a software application, or a suitable combination, that facilitates telephonic communications and accommodates telephonic features. In appropriate embodiments, telephonic features may include call dialing, call forwarding, call transfer, call holding, call muting, and conference calling and/or various directory services. In the illustrated embodiment, telephone 104 is coupled to client 102. In other embodiments, telephone 104 may be a component of client 102. In order to facilitate telephonic communications, telephone 104 may use network 106. In other embodiments, telephone 104 may further be coupled to a separate wired or wireless telephony network.

Network 106 represents communications equipment, including hardware and any appropriate controlling logic, for interconnecting elements and facilitating communication between these elements. Network 106 may include local area networks (LANs), metropolitan area networks (MANs), wide area networks (WANs), any other public or private network, local, regional, or global communication network, enterprise intranet, other suitable wireline or wireless communication link, or any combination thereof. Network 106 may include any combination of gateways, routers, hubs, switches, access points, base stations, and any other hardware, software, or a combination of the preceding that may implement any suitable protocol. The use of these or similar networks facilitate seamless communication between components of system 100 regardless of their geographic location or communication protocols employed.

Remote computer system 108 represents any appropriate combination of hardware, controlling logic, and data for providing a hosted virtual desktop environment to clients, such as client 102, and supporting interactive access to applications and data from multiple remote devices. Remote computer system 108 may support a wide variety of hosted virtual operations such as web browsing, word processing, and managing personal and business data. In particular embodiments, remote computer system 108 may provide access to richer set of applications and data than immediately available on client 102. For example, in some embodiments, remote computer system 108 may provide a rich set of telephony features for client 102 and/or telephone 104. In some embodiments, remote computer system 108 may include a networked server or collection of networked servers, or could include in one or more virtual servers capable of acquiring computing resources on-demand depending on the dynamically determined needs of multiple clients. Using virtual servers, remote computer system 108 could be scaled dynamically based on system requirements and real-time usage, without limiting operation to a particular physical computer server having fixed computing resources. This could facilitate the scalability, efficient operation, high availability, and cost effectiveness of the system. As illustrated, remote computer system 108 may couple to a network 106 to facilitate communication to other elements of system 100, such as client 102 and/or telephone 104.

Remote computer system 108 may include any number of structural or functional components. In the illustrated embodiment, remote computer system 108 includes application 116 and an interface 118. Application 116 represents any appropriate combination of hardware, controlling logic, and data for providing hosted virtual desktop environment to one or more clients, such as client 102. In particular embodiments, application 116 may include suitable logic for authenticating and providing interactive access to applications and data over network 106 to client 102 and/or telephone 104. Interface 118 represents any suitable combination of hardware, controlling logic, and data for facilitating communications between various elements of system 100, including remote computer system 108 and client 102 and/or telephone 104. For example, computer system 108 may use interface 118 to communicate with client 102 over network 106 to provide a hosted virtual desktop environment accessible to the user.

Call manager 110 represents any appropriate combination of hardware, controlling logic, and data for managing telephony and directory features for one or more clients and telephones. For example, in particular embodiments, call manager 110 may assign directory numbers to clients or telephones. Call manager 110 may also provide maintenance and support for telephonic features, and implement appropriate load balancing techniques. In the illustrated embodiment call manager 110 is illustrated as a separate component coupled to network 106. In particular embodiments, however, the call manager 110 may be coupled to the remote computer system 108. In other embodiments, call manager 110 may be component that is part of remote computer system 108. In some embodiments call manager 110 may run on a hosted system which may be separate from remote computer system 108.

While system 100 is illustrated as including specific components arranged in a particular configuration, it should be understood that various embodiments may operate using any suitable arrangement and collection of components capable of providing functionality such as that described. For example, system 100 may include any number of clients, telephones, and remote computer systems. Network 106 may comprise many different networks that are interconnected to provide a wide area network or local area network. In addition, in particular embodiments telephone 104 may be part of any client 102, and may in some instances exist as a software application providing a variety of telephony features. For example, such software applications may include Jabber, Cisco Unified Personal Communicator (CUPC), Cisco Unified Communications Integration for Microsoft Office Communicator (CUCIMOC), or any other suitable software application providing telephony services.

Figure 2:
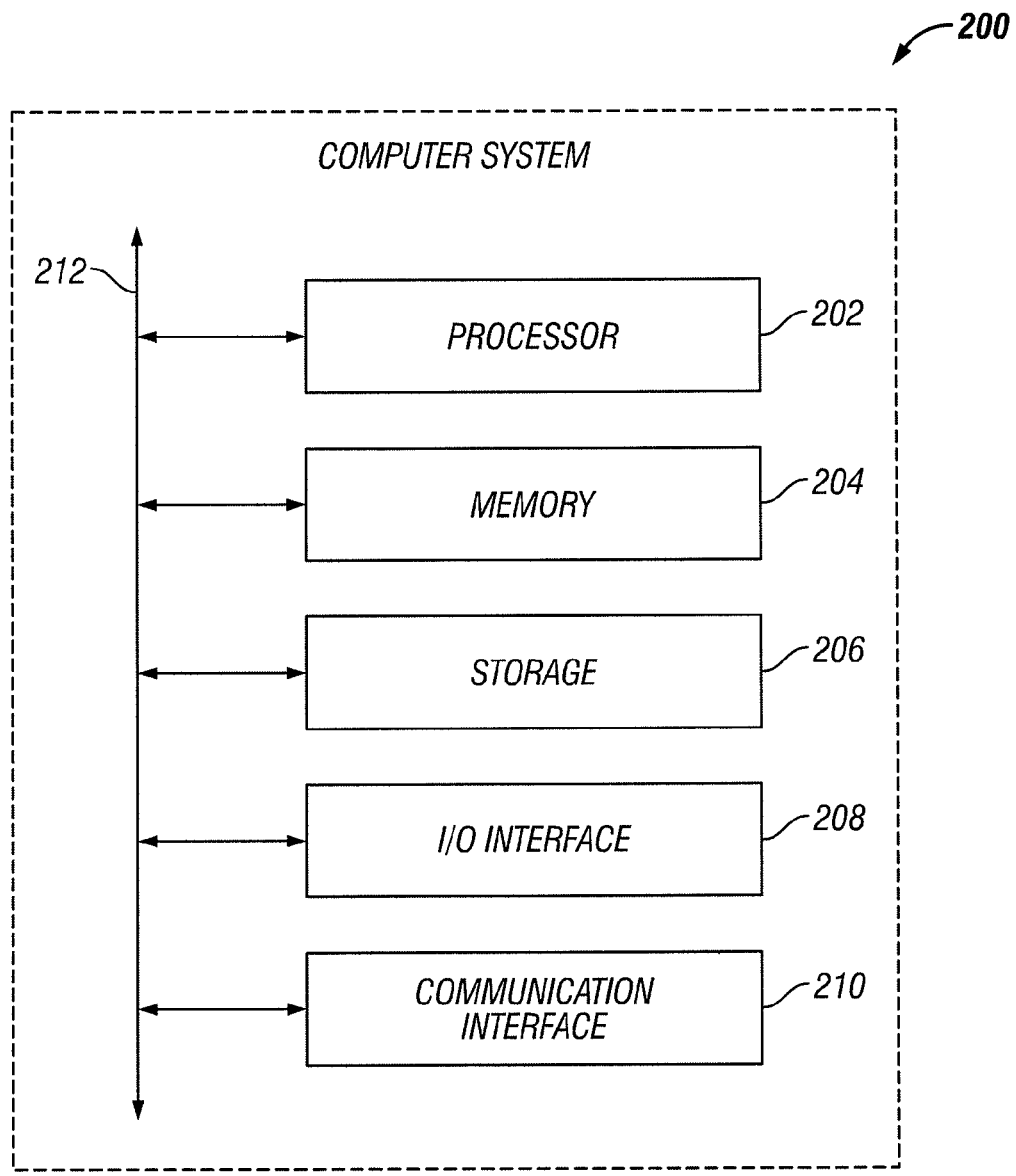
FIG. 2 is a block diagram illustrating an example computer system that may be used in embodiments of the present disclosure.

FIG. 2 illustrates an example computer system 200. In particular embodiments, one or more computer systems 200 perform one or more steps of one or more methods described or illustrated in the present disclosure. In particular embodiments, software running on one or more computer systems 200 performs one or more steps of one or more methods described or illustrated in the present disclosure or provides functionality described or illustrated herein. Particular embodiments include one or more portions of one or more computer systems 200. For example, in particular embodiments, computer system 200 may represent client 102 or remote computer system 108. In other embodiments, computer system 200 may represent telephone 104.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or an appropriate combination of such components. Where appropriate, computer system 200 may include one or more computer systems 200; be unitary or distributed; span multiple locations; span multiple machines; span multiple datacenters; or reside in a cloud, which may include one or more cloud components in one or more networks. Where appropriate, one or more computer systems 200 may perform without substantial spatial or temporal limitation one or more steps of one or more methods described or illustrated in the present disclosure. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

Computer system 200 includes a processor 202, memory 204, storage 206, an input/output (I/O) interface 208, a communication interface 210, and a bus 212 in particular embodiments. Although this disclosure describes and illustrates a particular computer system having a particular number of particular components in a particular arrangement, this disclosure contemplates any suitable computer system having any suitable number of any suitable components in any suitable arrangement.

Processor 202 includes hardware for executing instructions, such as those making up a computer program, in particular embodiments. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of internal caches, where appropriate. For example, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of internal registers, where appropriate. In particular embodiments, processor 202 may include one or more arithmetic logic units (ALUs); be a multi-core processor; or include one or more processors 202. Although this disclosure describes and illustrates a particular processor, this disclosure contemplates any suitable processor.

Memory 204 includes main memory for storing instructions for processor 202 to execute or data for processor 202 to operate on, in particular embodiments. For example, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate As appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204 as appropriate. Although this disclosure describes and illustrates particular memory, this disclosure contemplates any suitable memory.

Storage 206 includes mass storage for data or instructions in particular embodiments. For example, storage 206 may include an HDD, a floppy disk drive, flash memory, an optical disc, a magneto-optical disc, magnetic tape, or a Universal Serial Bus (USB) drive or any combination of such storage. Storage 206 may include removable or non-removable (or fixed) media as appropriate. Storage 206 may be internal or external to computer system 200. In particular embodiments, storage 206 is non-volatile, solid-state memory. In particular embodiments, storage 206 includes read-only memory (ROM). As appropriate, this ROM may be mask-programmed ROM, programmable ROM (PROM), erasable PROM (EPROM), electrically erasable PROM (EEPROM), electrically alterable ROM (EAROM), or flash memory or an suitable combination of such ROM. This disclosure contemplates mass storage 206 taking any suitable physical form. Storage 206 may include one or more storage control units facilitating communication between processor 202 and storage 206 as appropriate. Storage 206 may include one or more storages 206. Although this disclosure describes and illustrates particular storage, this disclosure contemplates any suitable storage.

I/O interface 208 includes hardware, software, or both providing one or more interfaces for communication between computer system 200 and one or more I/O devices, in particular embodiments. Computer system 200 may include one or more of these I/O devices as appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or any suitable combination of such I/O devices. An I/O device may include one or more sensors. This disclosure contemplates any suitable I/O devices and any suitable I/O interfaces 208 for them. As appropriate, I/O interface 208 may include one or more device or software drivers enabling processor 202 to drive one or more of these I/O devices. I/O interface 208 may include one or more I/O interfaces 208 as appropriate. Although this disclosure describes and illustrates a particular I/O interface, this disclosure contemplates any suitable I/O interface.

Communication interface 210 includes hardware, software, or both providing one or more interfaces for communication (such as, for example, packet-based communication) between computer system 200 and one or more other computer systems 200 or one or more networks, in particular embodiments. For example, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. For example, computer system 200 may communicate with an ad hoc network, a personal area network (PAN), a local area network (LAN), a wide area network (WAN), a metropolitan area network (MAN), or one or more portions of the Internet or an appropriate combination of these networks. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or an appropriate combination of these networks. Computer system 200 may include any suitable communication interface 210 for any of these networks as appropriate. Communication interface 210 may include one or more communication interfaces 210. Although this disclosure describes and illustrates a particular communication interface, this disclosure contemplates any suitable communication interface.

In particular embodiments, bus 212 includes hardware, software, or both coupling components of computer system 200 to each other. For example, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or an appropriate combination of busses. Bus 212 may include one or more buses 212 as appropriate. Although this disclosure describes and illustrates a particular bus, this disclosure contemplates any suitable bus or interconnect.

Reference to a computer-readable storage medium in the present disclosure encompasses one or more non-transitory, tangible computer-readable storage media possessing structure. For example, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or any appropriate combination of these. A computer-readable non-transitory storage medium may be volatile, non-volatile, or a combination of volatile and non-volatile as appropriate.

This disclosure contemplates one or more computer-readable storage media implementing any suitable storage. In particular embodiments, a computer-readable storage medium implements one or more portions of processor 202

(such as, for example, one or more internal registers or caches), one or more portions of memory 204, one or more portions of storage 206, or a combination of these as appropriate. In particular embodiments, a computer-readable storage medium implements RAM or ROM. In particular embodiments, a computer-readable storage medium implements volatile or persistent memory. In particular embodiments, one or more computer-readable storage media embody software. Reference to software in the present disclosure may encompass one or more applications, bytecode, one or more computer programs, one or more executables, one or more instructions, logic, machine code, one or more scripts, or source code, and vice versa as appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

While system 200 is illustrated as including specific components arranged in a particular configuration, it should be understood that various embodiments may operate using any suitable arrangement and collection of components capable of providing functionality such as that described.

Figure 3:
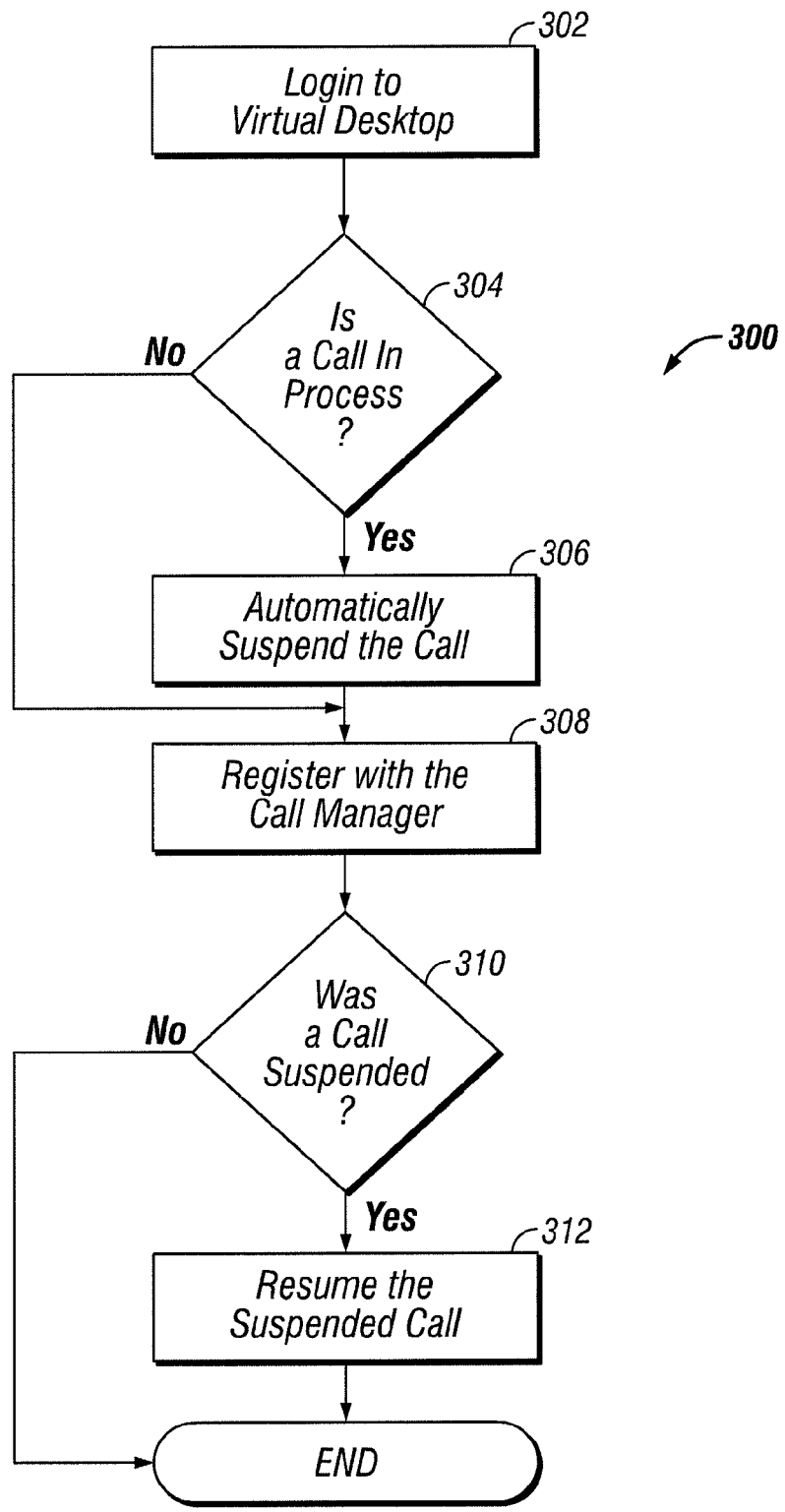
FIG. 3 illustrates an example process flow for facilitating seamless call transfer during a virtual desktop authentication process.

FIG. 3 is a process flow diagram illustrating a process flow 300 for seamless call transfer during virtual desktop authentication. The steps of process flow 300 correspond to an example sequence of steps for seamlessly transferring an active call to a new destination number during virtual desktop authentication. Such a seamless transfer process ensures that active phone calls do not get lost or dropped during the user authentication process seeking access to a virtual desktop environment or registration with a call manager. A process such as process flow 300 may be implemented on any appropriate element in a network such as client 102, telephone 104, or remote computer system 108 such that control for an active call can be seamlessly handed off to the hosted virtualized environment with minimal effect on the user calling experience.

In the illustration, process flow 300 includes a number of steps for providing seamless transfer of an active call during authentication to a hosted virtual desktop environment. As shown, these steps include a login step 302, an active call determination step 304, a call suspension step 306, a call registration step 308, a call suspension determination step 310 and a call resumption step 312. This collection of steps may be performed, for example, on a client such as a thin client, or a remote computer system using appropriate authentication mechanisms.

In operation, process flow 300 begins at the login step 302. In this step, the user of a thin client, such as client 102, supplies the appropriate credentials to access a virtual desktop environment hosted on one or more remote computer systems, such as remote computer system 108. In addition to credentials, the user may need to identify the specific remote computer system or particular applications or files that it seeks access to, in particular embodiments. The level of authorization and access to applications and data may be determined by a user profile and permissions corresponding to the user. This information is sent across a network to the appropriate remote computer system hosting the virtualized desktop environment.

Next, process flow 300 proceeds to active call determination step 304. At this step, the system determines whether an active call is in progress. For instance, a user employing client 102 and telephone 104 may currently be engaged in an active telephone call when it seeks to login to the hosted virtual desktop environment and/or register with the call manager. If the system determines that a call is in progress, process flow 300 proceeds to step 306. However, if a call is not in progress, process flow 300 proceeds to call registration step 308.

If process flow 300 has determined that an active call was in progress in step 304, the call is automatically suspended in step 306. In operation, such suspension may take place by parking the call, transferring the call, placing the call on hold, or any other appropriate suspension mechanism. Suspension may occur automatically without user intervention. For example, an active call may be suspended by parking the call to a temporary destination while the client registers with the call manager or performs additional authentication steps. In particular embodiments, parking a call allows a user to place a call on hold at one destination having a particular telephone number and retrieve and continue the conversion from a telephone at another destination having a different telephone number. Thus, when appropriate authentication processes are complete, the call can be retrieved from the parked destination and continue seamlessly. In other embodiments, call suspension may be performed by transferring the call to a new destination or by placing the call on hold to be retrieved later, following the various authentication processes.

Next, process flow 300 continues to call registration step 308 where the client and/or telephone may register with the call manager. In particular embodiments, registering with the call manager results in a new directory number being assigned to the client and/or telephone. This new directory number may replace any default directory number assigned to the client and/or telephone. In some embodiments, the new directory number and the default directory number may be the same number. Registration with the call manager may also result in a rich feature set being provided to the client and/or telephone. In certain embodiments, call manager registration may be executed by performing an extension mobility (EM) login at the call manager. Once call manager registration is complete, process 300 proceeds to call suspension determination step 310. In this step, the system determines whether the a previously active call was suspended. If there was a previously suspended call, process flow 300 proceeds to call resumption step 312, where the call is retrieved or activated as appropriate. The manner in which a call is resumed may depend on the way the call was originally suspended. For example, in particular embodiments, retrieving an active call may involve requesting and receiving access to a parked call. In other embodiments, resuming the call may involve activating a call that is on hold, or accessing a transferred call.

Although process flow 300 is illustrated as including specific steps, it should be understood that various embodiments may implement a seamless call transfer scheme using any appropriate combination of steps for seamless call transfer during virtual desktop authentication and call manager registration. For example, the steps of process flow 300 may be performed in any suitable order that facilitates the type of suspension of an active call being performed. In particular embodiments, the call manager registration step 308 may occur before a call is suspended in call suspension step 306. During call manager registration step 308, a new directory number may be assigned to a client and/or telephone. Once call manager registration is complete, an active call may be seamlessly transferred from its existing directory number to the new directory number. This may reduce or otherwise limit the latency or undesired effects on the user experience during the call.

In certain embodiments, additional steps may be added to process flow 300 to allow an appropriate message to be displayed when a call is suspended and/or when a call is resumed. This message may allow the user to cancel or delay the seamless transfer. According to particular implementations, the system may or may not perform these tasks.

In other embodiments, process flow 300 could be modified such that interaction with the remote computer system in step 302 may not be necessary. For example, the client 102 may login and register directly with call manager 110 using Extension Mobility (EM). Thus, process flow 300 may perform the disclosed seamless transfer without direct interaction with remote computer system 108.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus comprising:
a network interface;
a memory comprising an application; and
a processor operable, when executing the application, to:
  request access to a remote computer system for registration with a call manager;
  determine whether a call associated with the apparatus is active;
  automatically initiate suspension of the call in response to determining that the call is active and request registration of a telephone associated with the call, the registration associating a new telephone number with the telephone; and
  resume the suspended call.

2. The apparatus of claim 1, wherein the remote computer system is a hosted virtual desktop.

3. The apparatus of claim 1, wherein the telephone is part of the apparatus.

4. The apparatus of claim 1, wherein automatically initiating suspension of the call comprises parking the call.

5. The apparatus of claim 1, wherein automatically initiating suspension of the call comprises placing the call on hold.

6. The apparatus of claim 1, wherein the registration of the telephone occurs before automatically initiating suspension of the call and wherein automatically initiating suspension of the call comprises transferring the call.

7. The apparatus of claim 1, wherein associating a new telephone number with the telephone comprises replacing the default telephone number with the new telephone number.

8. A method comprising:
using a processor to request access for an apparatus to a remote computer system over a network interface to register with a call manager;
determining whether a call associated with the apparatus is active;
automatically initiating suspension of the call in response to determining that the call is active and requesting registration of a telephone associated with the call, the registration associating a new telephone number with the telephone; and
resuming the suspending call.

9. The method of claim 8, wherein the remote computer system is a hosted virtual desktop.

10. The method of claim 8, wherein the telephone is part of the apparatus.

11. The method of claim 8, wherein automatically initiating suspension of the call comprises parking the call.

12. The method of claim 8, wherein automatically initiating suspension of the call comprises placing the call on hold.

13. The method of claim 8, wherein the registration of the telephone occurs before automatically initiating suspension of the call and wherein automatically initiating suspension of the call comprises transferring the call.

14. The method of claim 8, wherein associating a new telephone number with the telephone comprises replacing the default telephone number with the new telephone number.

15. A non-transitory computer-readable medium comprising instructions, the instructions operable when executed by a processor to:
request access for an apparatus to a remote computer system over a network interface to register with a call manager;
determine whether a call associated with the apparatus is active;
automatically initiate suspension of the call in response to determining that the call is active and request registration of a telephone associated with the call, the registration associating a new telephone number with the telephone; and
resume the suspending call.

16. The non-transitory computer-readable medium of claim 15, wherein the remote computer system is a hosted virtual desktop.

17. The non-transitory computer-readable medium of claim 15, wherein the telephone is part of the apparatus.

18. The non-transitory computer-readable medium of claim 15, wherein automatically initiating suspension of the call comprises parking the call.

19. The non-transitory computer-readable medium of claim 15, wherein automatically initiating suspension of the call comprises placing the call on hold.

20. The non-transitory computer-readable medium of claim 15, wherein the registration of the telephone occurs before automatically initiating suspension of the call and wherein automatically initiating suspension of the call comprises transferring the call.

21. The non-transitory computer-readable medium of claim 15, wherein associating a new telephone number with the telephone comprises replacing the default telephone number with the new telephone number.

* * * * *